(12) United States Patent
Ceria

(10) Patent No.: US 8,006,452 B2
(45) Date of Patent: Aug. 30, 2011

(54) INSULATING PANEL FOR BUILDINGS, PROVIDED WITH AN AUXILIARY UNIT, IN PARTICULAR A PHOTOVOLTAIC UNIT, AND WITH IMPROVED MEANS FOR SUPPORTING AND HOLDING THE AUXILIARY UNIT

(75) Inventor: Esterino Ceria, Turin (IT)

(73) Assignee: Isolpack S.p.A., Turin (IT)

( * ) Notice: Subject to any disclaimer, the term of this patent is extended or adjusted under 35 U.S.C. 154(b) by 374 days.

(21) Appl. No.: 12/207,862

(22) Filed: Sep. 10, 2008

(65) Prior Publication Data

US 2009/0064606 A1   Mar. 12, 2009

(30) Foreign Application Priority Data

Sep. 10, 2007  (IT) .............................. TO2007A0633

(51) Int. Cl.
*E04B 3/30* (2006.01)
*E04D 3/35* (2006.01)

(52) U.S. Cl. ................. 52/506.05; 52/506.01; 52/787.1; 52/543

(58) Field of Classification Search ................. 52/173.3, 52/782.1, 783.11, 783.14, 787.1, 506.01, 52/506.5, 506.06, 474, 543, 506.04, 24; 136/244; 248/200, 205.1, 214, 220.21, 220.22, 223.41, 248/226.11, 228.6, 231.71
See application file for complete search history.

(56) References Cited

U.S. PATENT DOCUMENTS

| | | | | | |
|---|---|---|---|---|---|
| 1,546,556 | A | * | 7/1925 | Scheying | 52/506.04 |
| 2,007,038 | A | * | 7/1935 | De Wolf | 52/506.04 |
| 2,075,676 | A | * | 3/1937 | Toney | 52/466 |
| 4,062,164 | A | * | 12/1977 | Cousins | 52/506.07 |
| 4,650,180 | A | * | 3/1987 | Blondel | 472/92 |
| 5,430,982 | A | * | 7/1995 | Bane | 52/202 |
| 6,631,589 | B1 | * | 10/2003 | Friedman et al. | 52/30 |
| 6,973,756 | B2 | * | 12/2005 | Hatzinikolas | 52/235 |
| 7,469,508 | B2 | * | 12/2008 | Ceria | 52/173.3 |
| 7,469,511 | B2 | * | 12/2008 | Wobber | 52/474 |
| 2009/0272061 | A1 | * | 11/2009 | Thompson | 52/506.05 |
| 2010/0095626 | A1 | * | 4/2010 | Embler et al. | 52/506.05 |

FOREIGN PATENT DOCUMENTS

EP  1548202 A2  6/2005

* cited by examiner

*Primary Examiner* — Eileen Lillis
*Assistant Examiner* — Alp Akbasli
(74) *Attorney, Agent, or Firm* — Heslin Rothenberg Farley & Mesiti P.C.; Victor A. Cardona, Esq.

(57) ABSTRACT

A prefabricated insulating panel for making outer surfaces of buildings, integrating an auxiliary panel unit, particularly a photovoltaic unit, is equipped with one or more quick-fit retention members of the auxiliary panel unit, each quick-fit retention members including an engaging portion to retain said auxiliary panel unit in a position thereof resting over the insulating panel, which members can be anchored quickly to said insulating panel without the need to make holes in the insulating panel and/or in the structure of said auxiliary panel unit for the engagement of fixing elements such as screws or the like.

19 Claims, 7 Drawing Sheets

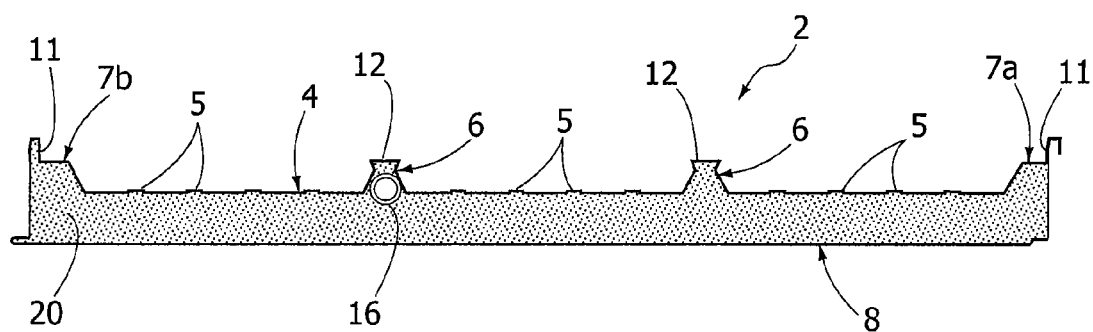
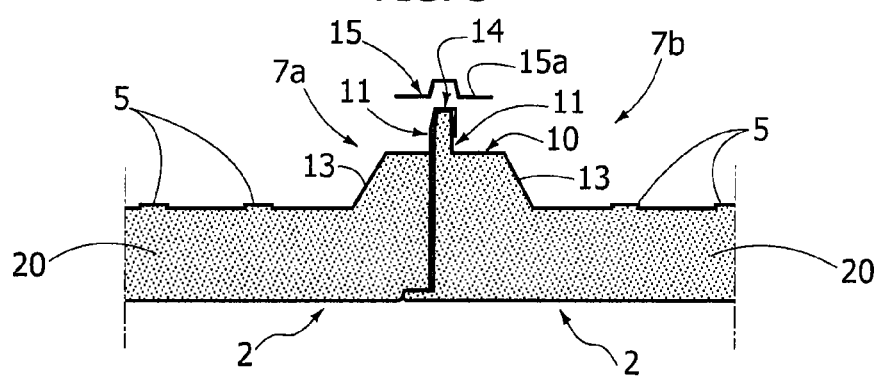

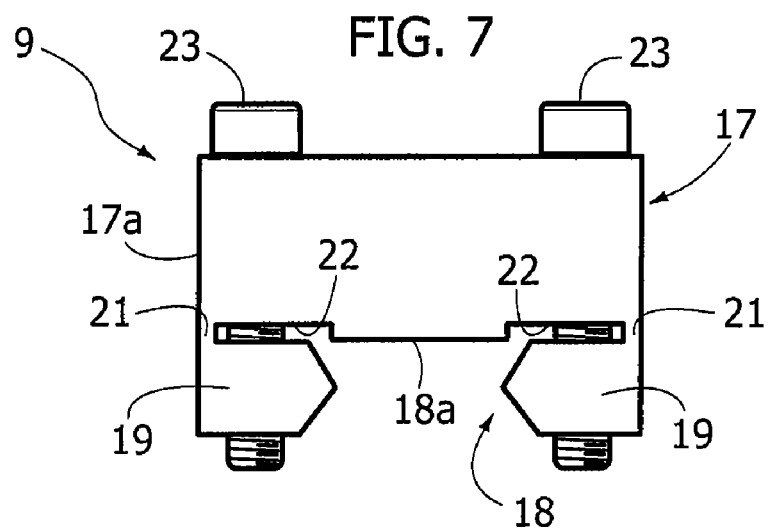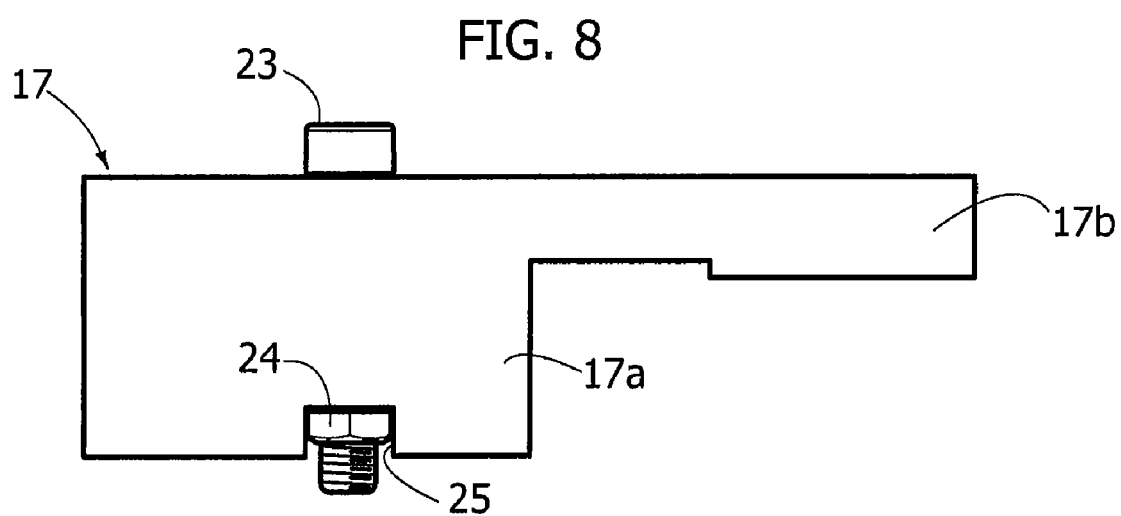

INSULATING PANEL FOR BUILDINGS, PROVIDED WITH AN AUXILIARY UNIT, IN PARTICULAR A PHOTOVOLTAIC UNIT, AND WITH IMPROVED MEANS FOR SUPPORTING AND HOLDING THE AUXILIARY UNIT

CROSS REFERENCE TO RELATED APPLICATIONS

This application claims priority from Italian patent application No. TO2007A000633, filed on Sep. 10, 2007, the entire disclosure of which is incorporated herein by reference.

FIELD OF THE INVENTION

The present invention refers to a prefabricated insulating panel for obtaining outer surfaces of buildings, of the type comprising:

a first sheet of rigid material, particularly metal material, having a plurality of substantially parallel longitudinal or transversal ribs that rise from a general plane of a respective face of the panel, a second sheet of rigid or semirigid material, particularly metal material, or, for example of paper or fiberglass, or another suitable material, a layer of insulating or lagging material between the first and the second sheet, and at least one auxiliary panel unit, particularly a photovoltaic unit, resting and supported at least at, or in proximity of, its two opposed edges, on two main longitudinal ribs of said first sheet, in such a way that said auxiliary panel unit extends between said opposed edges at a distance from the aforementioned general plane of the insulating panel, and in which said insulating panel is equipped with means to retain said auxiliary panel unit in position over said insulating panel.

BACKGROUND ART

An insulating panel having the characteristics indicated above is described in the European patent application EP 1 548 202 A2 by the same Applicant. The insulating panel that constitutes the object of said previous proposal consists of a prefabricated monolithic modular component, equipped with one or more auxiliary units, specifically photovoltaic units, and equipped with their respective connection cabling, ready for installation.

The use of panels of this type is advantageous, since the installation of such panels may be performed using methods similar to those envisaged for conventional panels, but such an installation achieves the dual result of, on the one hand, obtaining or equipping the outer surfaces of buildings, and in particular, roofs, and, on the other, of simply and easily obtaining the availability of a photovoltaic system without the need for a dedicated support frame, and with the advantage of being able to pre-assemble the auxiliary units on the insulating panels in the workshop, before installation of the insulating panels.

In the specific embodiment illustrated in EP 1 548 202 A2, the means destined to hold each photovoltaic unit in position over the corresponding insulating panel comprise brackets attached to the insulating panel with screws. This solution is not wholly satisfactory, since it involves the creation of holes—to use the fixing screws of said brackets—in the structure of the insulating panel, which may not be desired, and which in any case requires the execution of time-consuming operations.

SUMMARY OF THE INVENTION

The purpose of the present invention is to improve the previously proposed insulation panel and, in particular, to render the means designed to retain each auxiliary unit on the corresponding insulation panel simpler and more functional.

With a view to achieving this aim, the object of the invention is an insulating panel having the characteristics indicated above, and also characterized by the fact that the aforementioned means of retention include one or more quick-fit retention members, each comprising an engaging portion to retain said auxiliary panel unit in position resting over the insulating panel, that can be anchored quickly to said insulating panel without the need to make holes in the insulating panel and/or in the structure of said auxiliary panel unit for the use of fixing elements such as screws or the like.

In a preferred embodiment, the aforementioned quick-fit retention members are arranged to be fitted on respective longitudinal ribs of said first panel. Preferably, said retention members are fitted on said longitudinal ribs with the possibility of sliding along them, and are provided with means for their blocking in position on the respective longitudinal ribs.

Again insofar as the aforementioned preferred embodiment is concerned, the quick-fit retention members are arranged to have their engaging portions in contact over the end edges of the respective panel auxiliary units that are transverse to the aforementioned longitudinal ribs.

Again in the case of the preferred embodiment, the aforementioned first sheet of the insulating panel includes at least one auxiliary longitudinal rib, extending between said main longitudinal ribs (on which the two opposed edges of the auxiliary panel unit lie) and at a distance from both said main ribs, said auxiliary rib serving to anchor one or more quick-fit retention members.

Each retention member and the corresponding auxiliary longitudinal rib on which it is anchored present respective coupling parts having complementary transverse sections, to enable a shape coupling of said retention member over said auxiliary longitudinal rib.

The retention member presents a body having a main portion wherein a longitudinal groove is obtained, whose section corresponds to the transverse section of the corresponding auxiliary rib, for the shape coupling over said rib, and at least one secondary cantilevered portion projecting beyond said main portion, that defines the aforementioned portion for engaging and retaining the auxiliary panel unit.

The body of the retention member has at least one part configured as a clamp and equipped with at least one screw to tighten it over the respective rib.

According to a further important characteristic of the present invention, not only does the auxiliary panel unit rest over the aforementioned main longitudinal ribs of the insulating panel at its opposed edges, the auxiliary unit also resting over one or more of the aforementioned auxiliary longitudinal ribs on which the quick-fit retention members may be anchored.

In the case of the preferred embodiment, the main longitudinal ribs extend in height above the plane on which the auxiliary panel unit lies, and are shaped such that each defines a resting surface of the corresponding edge of the auxiliary panel unit and a surface that delimits the seat of the auxiliary panel unit, being orthogonal to said resting surface. By contrast, each of said auxiliary longitudinal ribs has a height that corresponds to the distance of the auxiliary panel unit from the aforementioned face of the insulating panel, since each of these defines, with its head surfaces, a resting surface for an intermediate area of the auxiliary panel unit.

According to a further preferred characteristic of the invention, each insulating panel comprises two of said main longitudinal ribs that extend along the two opposed longitudinal edges of the insulating panel. A first one of these main longitudinal ribs presents an upper portion defining the aforementioned orthogonal surface delimiting the seat for the auxiliary panel unit, that projects laterally from the insulating panel and from the corresponding side surface of the layer of insulating material. The second main longitudinal rib, arranged along the opposed longitudinal edge of the insulating panel, has a respective upper part—defining the aforementioned orthogonal surface delimiting the seat for the auxiliary panel unit—which terminates substantially flush with the corresponding side edge of the insulating panel and with the layer of the insulating material. In this way, several identical insulating panels may be arranged side by side with their longitudinal edges next to and in contact with one another, and with the projecting portion of the first main rib of an insulating panel overlapping the second main longitudinal rib of another insulating panel.

Preferably U-brackets elements are further provided, that may each be fitted over the superimposed ribs of two insulating panels arranged side by side, each bracket element having wings that can lie over the auxiliary units associated with these panels, to maintain said units in position over the respective insulating panels.

In the case that constitutes the preferred application of the present invention, in which the aforementioned auxiliary panel units are photovoltaic units, the panel according to the invention is also, as proposed in EP 1 548 202 A2 equipped with at least one pipe for the passage of cables for the electrical connection of said unit, prearranged between said first and second sheet of the insulating panel.

Thanks to the characteristics indicated above, the panel according to the invention not only presents the advantages specific to the solution already proposed by the Applicant in EP 1 548 202 A2, but also presents further advantages in terms of quickness of installation and safety, specifically with reference to the support and retention in position of the auxiliary units, even when they are of notable dimensions.

BRIEF DESCRIPTION OF THE DRAWINGS

Further characteristics and advantages of the invention will now be described with reference to the annexed drawings, provided by mere way of non-limiting example, wherein:

FIG. 2 is a sectional view of an insulating panel according to the invention, without the auxiliary unit, FIG. 3 shows the detail of the joint between two juxtaposed panels, FIGS. 7 and 8 are an end view and a side view of the member illustrated in FIG. 6.

DESCRIPTION OF PREFERRED EMBODIMENTS OF THE INVENTION

Figure 1:
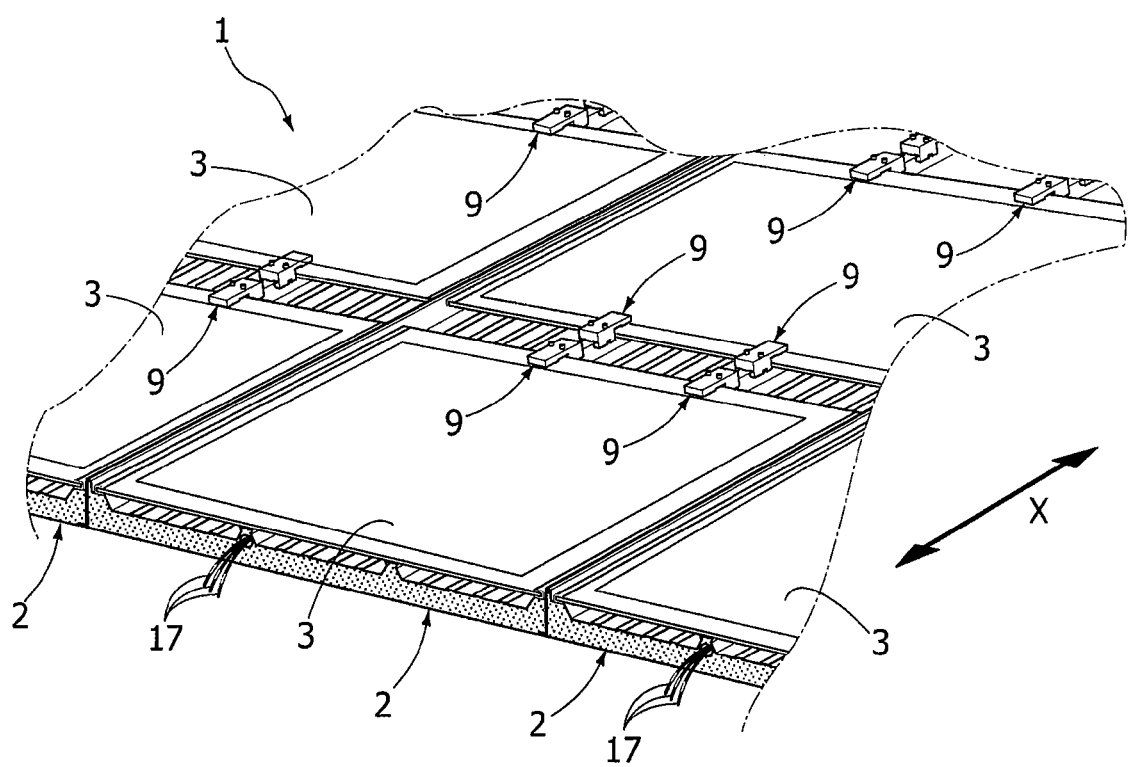
FIG. 1 is a partial perspective view of a covering of a building using a plurality of insulating panels according to the present invention.

In FIG. 1, reference number 1 indicates as a whole a covering for a roof of a building, obtained using a plurality of prefabricated insulating panels 2 according to the present invention, each extending over the whole dimension of the covering 1 in the longitudinal direction indicated by X in the figure. Insulating panels 2 are laid next to one another side by side, with their longitudinal edges in reciprocal contact, and several photovoltaic panel units 3 are mounted on each panel 2.

The general structure and the method of manufacturing of the insulating panels 2 are wholly identical to those described in EP 1 548 202 A2 by the same Applicant, and thus will not be described in detail here.

With reference to FIG. 2, each panel 2 comprises a first sheet 4 of rigid material, in particular a metal material, having a plurality of longitudinal ribs 5, 6, 7A and 7B, which rise from the general plane of the respective face of the panel, and a second sheet 8 of rigid or semi-rigid material, in particular a metal material. A layer of insulating or lagging material 20 is interposed between the two sheets 4 and 8, in a known manner.

In the case of the embodiment illustrated in FIG. 2, the longitudinal ribs prearranged on the first sheet 4 of the insulating panel 2 are of three types. A first type comprises longitudinal or transversal ribs (that is, orthogonal to the main ribs) 5, of reduced height, having substantially the function of increasing rigidity, and distributed uniformly and equidistantly across the width of the panel. A second type comprises two main longitudinal ribs 7A and 7B, on which two opposed edges of the respective photovoltaic auxiliary unit 3 rest (see FIGS. 1 and 4). A third type comprises two auxiliary longitudinal ribs 6 that extend laterally and equidistantly in the area between the two main longitudinal ribs 7A and 7B, which are used both to support the respective photovoltaic unit 3 and to anchor retention members 9 adapted to engage and retain in position each photovoltaic unit 3 over the respective insulating panel 2.

Figure 4:
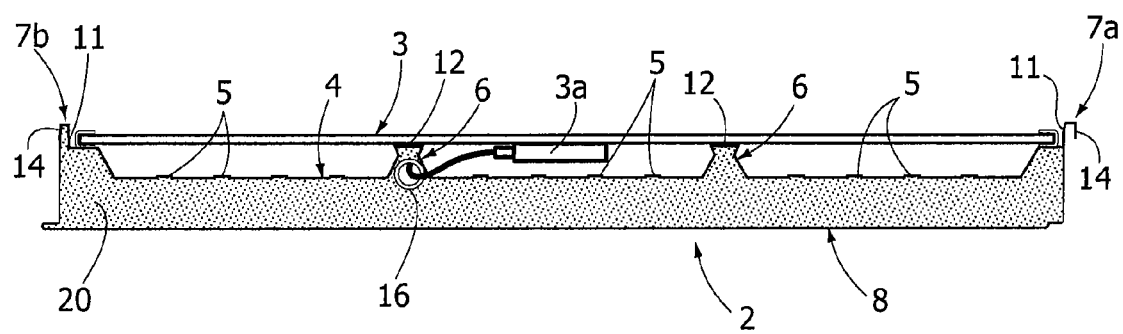
FIG. 4 is a section corresponding to the section of FIG. 2, completed with a photovoltaic auxiliary unit and the means of electrical connection thereof.

As is clearly visible in FIG. 4, the main longitudinal ribs 7A and 7B extend in height above the plane on which the photovoltaic unit 3 lies and are shaped such that each defines a resting surface 10 (see FIGS. 3 and 5) of the corresponding edge of the photovoltaic unit 3, and a surface 11 (see FIGS. 2, 3 and 4) that delimits the seat for the photovoltaic unit 3 that is orthogonal to the resting surface 10.

As is also clearly visible in FIG. 4, the auxiliary longitudinal ribs 6 have instead a height that corresponds to the level of the resting surfaces 10, i.e., to the distance between the photovoltaic unit 3 and the general plane of the first sheet 4, and have a head surface 12 (see FIGS. 2 and 4) on which the photovoltaic unit 3 rests.

Again with reference to the embodiment visible in FIGS. 2-5, the wall defining the resting surface 10 of each of the main longitudinal ribs 7A and 7B, is connected to the plane of the sheet 4 by an inclined wall 13 (FIG. 5), while the vertical wall (with respect to the drawings) defining the surface 11 is prolonged into a projection 14 that includes a small horizontal wall, which then extends in a further vertical wall directed downwards (again with reference to the figures).

In the case of the first main longitudinal rib 7A, projection 14 projects beyond the respective side edge of insulating panel 2 and beyond the respective side edge of the insulating layer 20, while in the case of main longitudinal rib 7B, the projection 14 has the end thereof arranged flush with the longitudinal side edge of panel 2. Thanks to this configuration, two identical panels can be laid side by side as illustrated in FIG. 3, with projection 14 of rib 7A of one panel superimposed over the corresponding projection 14 of rib 7B of the other panel 2.

Figure 5:
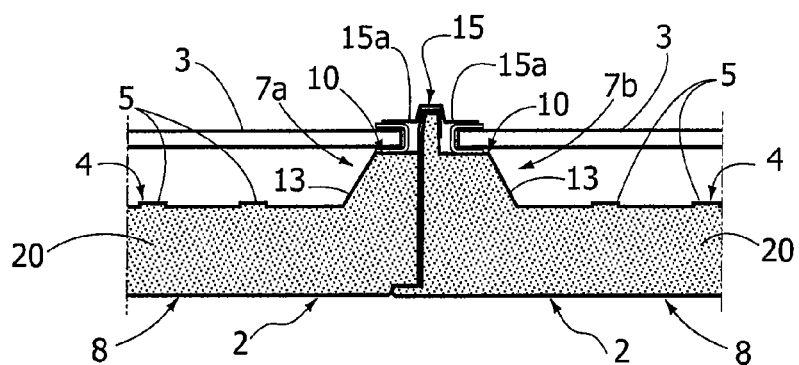
FIG. 5 is a view corresponding to the view of FIG. 3, which partially shows the two photovoltaic auxiliary units associated with the two insulating panels that are placed side by side.
Figure 6:
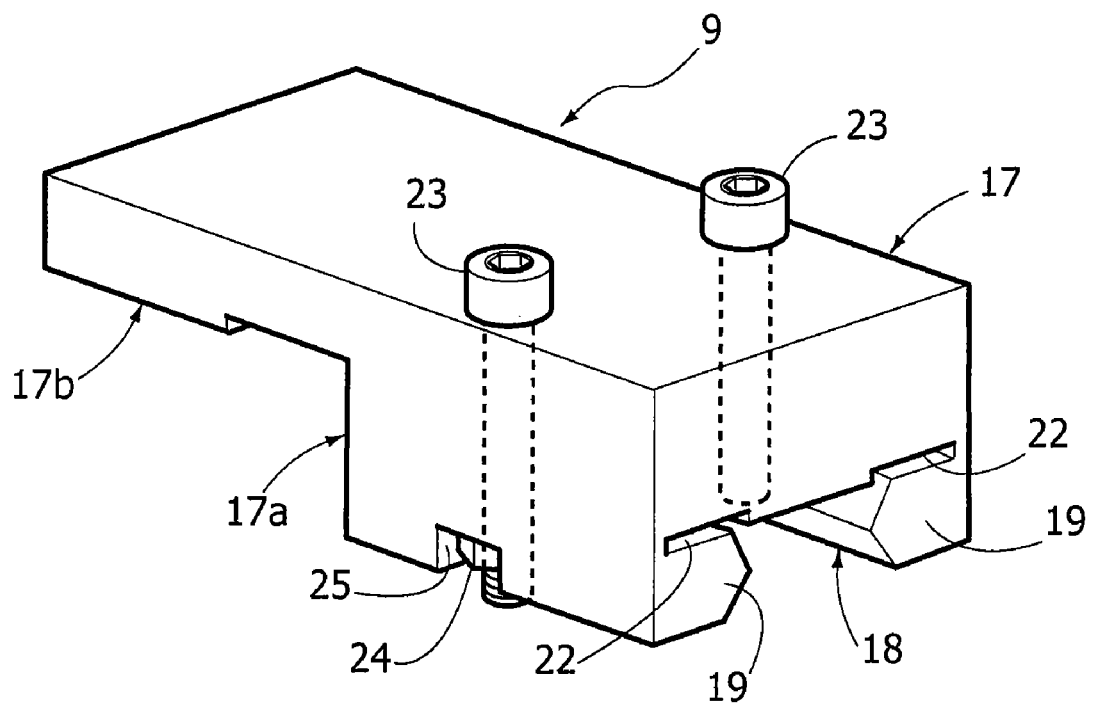
FIG. 6 is a perspective view of a first embodiment of a retention member for the photovoltaic auxiliary units that is part of the panel according to the invention.
Figure 9:
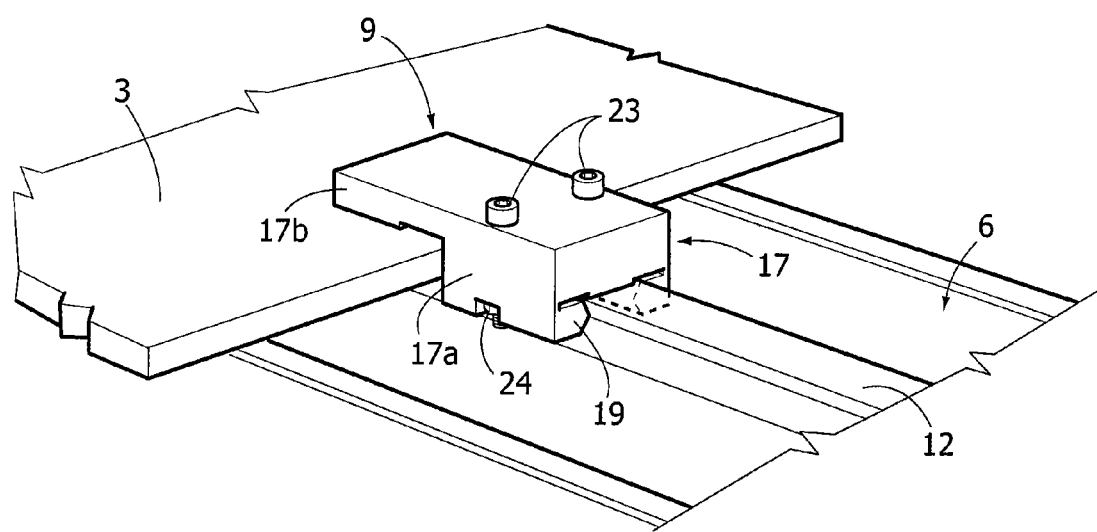
FIG. 9 is a perspective view that illustrates the retention member of FIG. 6 after installation.

As may be seen in FIGS. 3 and 5, once this superposition has been achieved, the respective photovoltaic units 3 associated to the panels that are juxtaposed can be held in position along the longitudinal edges of the panels by means of U-bracket elements 15, in metal material for example, that may be push-coupled over the superimposed projections 14 of the two panels, and which have respective wings 15a that can hold the longitudinal edges of the photovoltaic units 3 in position over their respective resting surfaces 10.

Again with reference to FIGS. 2 and 3, the embodiment illustrated therein envisages auxiliary ribs 6 that present a transverse section that is essentially dovetail in shape, with two inclined side walls that rise from the plane of panel 4 and converge towards the top, to an area of minimum width after which the walls then diverge again until they join the head wall 12.

Finally, as is visible in FIGS. 1, 2 and 4, each insulating panel 2 is equipped with at least one pipe element 16 for guiding cables 17 designed for the electrical connection of the photovoltaic unit 3. In a way similar to that envisaged in EP 1 548 202 A2, the pipe element 16 is arranged inside insulating panel 2, within the insulating material 20 between the two sheets 4 and 8. In the specific case illustrated here, it extends inside one of the aforementioned auxiliary ribs 6 (which were not provided in EP 1 548 202 A2). Again analogously with the proposal illustrated in EP 1 548 202 A2, an electrical connection box 3a is provided underneath each photovoltaic unit 3, to which the cables from the aforementioned pipe element 16 (FIG. 4) are connected.

As indicated above with reference to FIG. 1 of the attached drawings, quick-fit retention members 9 are anchored to auxiliary ribs 6, designed to retain each photovoltaic unit 3 at the edges that are transverse to the longitudinal direction X of the panels.

FIGS. 6-9 illustrate a first embodiment of one of said quick-fit retention members. In the case of this example, member 9 comprises a body in plastic material 17 with a main portion 17a designed to be anchored over a rib 6 of the insulating panel 2, and a cantilevered auxiliary portion 17b projecting over the main portion and defining a wall adapted to extend over a respective edge of a photovoltaic unit 3 (as may be seen in FIGS. 1 and 9) in order to retain said unit in position. Main portion 17a of body 27 has a lower face in which a longitudinal groove 17 is defined, with a section of shape that substantially corresponds to the section of the auxiliary transverse ribs 6, allowing a shape coupling of member 9 over one of said ribs 6.

With specific reference to FIG. 7, the main portion 17a of body 17 has two wings 19 that define the flanks of rib 18 and are joined to the upper part of portion 17a by means of two parts of reduced thickness 21, which are defined by cuttings 22 formed in body 17 starting from the edges of the bottom wall of groove 18. A screw 23 passes through each of said wings 19, which screw engages with through-holes (not visible in the figure) formed through the full height of body 17.

Each screw 23 is engaged in a nut 24 that is retained against rotation within a seat 25 of body 17 (FIG. 8).

For installation, each member 9 is slidingly mounted onto a respective auxiliary longitudinal rib 6, starting from one end of a panel, and it is then locked in position on said rib by tightening the screws 23. Tightening these screws causes in fact wings 19 to move upwards (with reference to FIG. 7), such that body 17 tightens over the respective rib 6, with the bottom surface 18a of the groove 18 thereof pressing against the head 12 of the respective rib 6, and by pressing through the wings 19 against the flanks of rib 6. In particular, wings 19 define a substantially X-shaped transverse section for groove 18, each flank of the groove having two converging inclined surfaces that fit at the corresponding inclined surfaces of the flanks of rib 6 (see FIG. 9).

Figure 10:
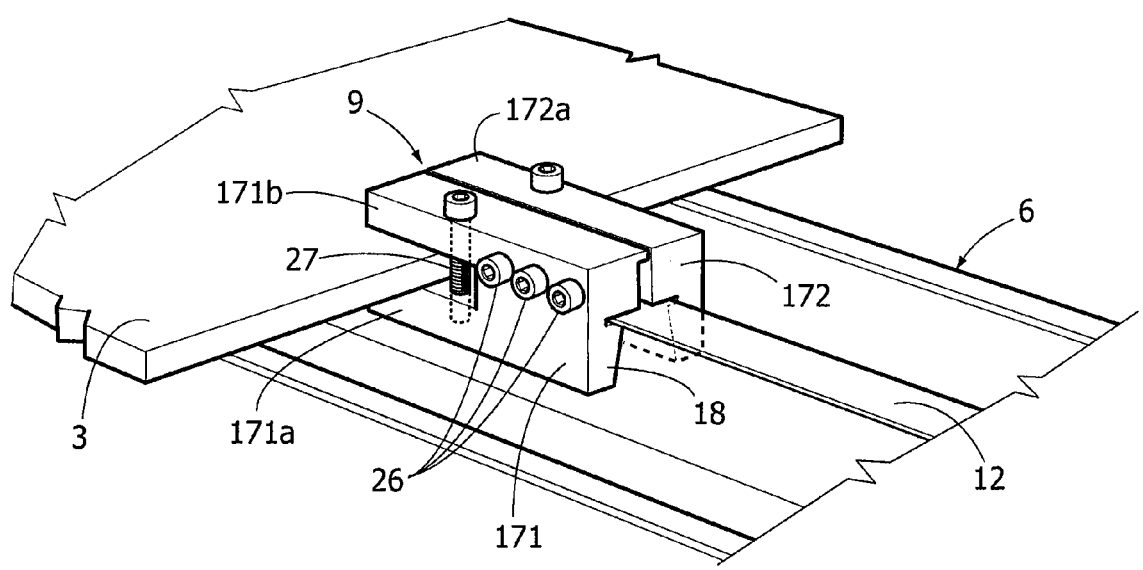
FIG. 10 is a variant of FIG. 9 which Illustrates a Second Embodiment of the retention member that is part of the panel according to the invention.

FIG. 10 illustrates a variant in which the main body 17a of the retention member 9 consists of two separate elements 171 and 172 that define rib 18 between them, and may be tightened together and against the two flanks of rib 6 by means of transverse screws 26. In this embodiment, each of the elements 171 and 172 has a cantilevered projecting auxiliary portion, defining a clamp with two jaws, 171a and 171b, and 172a and 172b, that may be tightened by means of respective screws 27 against the two opposed faces of the photovoltaic unit 3 so as to lock it in position. In the example illustrated in FIG. 10, also the shapes of the transverse section of auxiliary rib 6 and of groove 18 are slightly different to those illustrated in FIGS. 6-9.

However, it is Evident that the Configuration of Both the Transverse Section of auxiliary rib 6 and of the body of retention member 9 may be wholly different with respect to the above described one by mere way of non-limiting example.

As is evident from the above, the panel according to the invention is characterized by not only all the advantageous aspects of the solution previously described in EP 1 548 202 A2, but also by the extreme simplicity and quickness of installation of the means to hold photovoltaic units 3 in position. Moreover, the proposed solution is further characterized by the fact that auxiliary ribs 6, prearranged in the panel for the purpose of providing the anchoring surface for the retention members 9, are also used to support the photovoltaic units 3 in their intermediate area between the two opposed edges that lie on the main ribs 7A and 7B, which fact ensures the stability of the assembly, even with large photovoltaic units.

Clearly, without prejudice to the principles of the invention, the construction details and the embodiments could widely vary with respect to what has been described and shown by mere way of example, without departing for this reason from the scope of the present invention.

It should be noted in particular that, although the invention has been described with particular reference to the use of photovoltaic auxiliary units, the use of the inventive solutions with auxiliary units of other types is absolutely not excluded.

What is claimed is:

1. An insulating panel to make outer surfaces of buildings, comprising
    a first sheet of rigid material, having at least one plurality of substantially parallel ribs that rise from a general plane of a respective face of the panel,
    a second sheet of rigid or semi-rigid material,
    a layer of insulating material between the first and the second sheet, and
    at least one auxiliary panel unit, resting and supported at least at, or close to, two opposed edges of said unit on two main ribs of said plurality of ribs, such that said auxiliary panel unit extends between said opposed edges at a distance from said general plane of the insulating panel, wherein said insulating panel is provided with retention means to retain said unit in position above said insulating panel, wherein said retention means comprise one or more quick-fit retention members, each comprising an engagement portion to retain said unit in a position thereof resting over the insulating panel, each retention member being adapted to be anchored in a quick manner to said insulating panel without the need to make holes in the insulating panel and/or in a structure of said auxiliary panel unit for engagement of fixing elements, wherein said plurality of ribs includes at least one auxiliary rib extending intermediate to, and spaced apart from, two said main ribs, on which auxiliary rib at least one of said quick-fit retention members is anchored, and wherein each retention member and the respective auxiliary rib comprise respective coupling parts having complementary transverse sections, so as to enable a shape coupling of said retention member over said auxiliary rib with possibility of sliding relative to said auxiliary rib, but without the possibility of separation of the retention member from said auxiliary rib.

2. The panel according to claim 1, wherein said plurality of ribs consist of longitudinal ribs of said first sheet.

3. The panel according to claim 1, wherein said quick-fit retention members are provided with means for locking in position on the respective auxiliary rib.

4. The panel according to claim 1, wherein said quick-fit retention members have the engagement portions thereof engaged over end edges of said auxiliary panel unit that are transverse with respect to said plurality of ribs.

5. The panel according to claim 1, wherein each auxiliary rib has a head wall, parallel to the general plane of said first sheet, and two lateral walls recessed with respect to side edges of said head wall.

6. The panel according to claim 5, wherein each auxiliary rib has a transverse section with a substantially dovetail shape.

7. The panel according to claim 1, wherein each retention member has a body having a main portion in which a longitudinal groove is defined, said groove having a section that corresponds to the transverse section of the respective auxiliary rib, for a shape coupling over said auxiliary rib, and at least one secondary cantilevered portion projecting beyond said main portion, that defines the aforementioned engagement portion.

8. The panel according to claim 7, wherein said main portion of the body of the retention member has at least one part configured as a clamp and provided with at least one screw to tighten it over the respective rib.

9. The panel according to claim 8, wherein said part configured as a clamp is arranged on one or both flanks of said longitudinal groove and is engaged by a tightening screw that is orthogonal to the plane on which the insulating panel lies.

10. The panel according to claim 8, wherein said main portion of the body of the retention member consists of two separate elements that together define said longitudinal groove and that are adapted to be locked together over said auxiliary rib by means of one or more tightening screws.

11. The panel according to claim 7, wherein the body of the retention member has two cantilevered secondary portions projecting from said main portion, that are adapted to be tightened as a clamp by means of at least one screw over opposed faces of said auxiliary panel unit.

12. The panel according to claim 1, wherein on said at least one auxiliary rib the auxiliary panel unit rests at an intermediate area thereof between said two opposed edges that rest on said main ribs.

13. The panel according to claim, 1 wherein said auxiliary panel unit is a photovoltaic unit and at least one pipe element for passage of cables for electrical connection of said unit is provided between the first and second sheet of the insulating panel.

14. An insulating panel to make outer surfaces of buildings, comprising a first sheet of rigid material, having a plurality of substantially parallel longitudinal ribs that rise from a general plane of a respective face of the panel, a second sheet of rigid or semirigid material, a layer of insulating material between the first and the second sheet, and at least one auxiliary panel unit, resting and supported at least at, or close to, two opposed edges of said unit on two main longitudinal ribs of said plurality of ribs, such that said auxiliary panel unit extends between said opposed edges at a distance from the afore mentioned general plane of the insulating panel, wherein said first sheet includes at least one auxiliary longitudinal rib extending intermediate to said main longitudinal ribs at a distance therefrom, on which auxiliary longitudinal rib at least the auxiliary panel unit rests in an intermediate area between the two said opposed edges, wherein said main longitudinal ribs extend in height above the plane on which the auxiliary panel unit lies and are shaped such that each defines a resting surface of a corresponding edge of the auxiliary panel unit and a surface that delimits a seat for the auxiliary panel unit, orthogonal to said resting surface, while said at least one auxiliary longitudinal rib has a height corresponding to the distance of the auxiliary panel unit from the aforementioned face of the insulating panel, so as to define with a head surface thereof a resting surface for an intermediate area of the auxiliary panel unit, wherein to of said main longitudinal ribs are provided, that extend along two opposed longitudinal edges of said insulating panel, wherein a first one of said main longitudinal ribs has an upper portion that defines the aforementioned orthogonal surface delimiting the seat for the auxiliary panel unit and that projects laterally from the insulating panel and from a corresponding side surface of the layer of insulating material, and wherein the second longitudinal main rib, that is arranged along an opposite longitudinal edge of the insulating panel, has an upper portion that defines the aforementioned orthogonal surface delimiting the seat for the auxiliary panel unit, that terminates substantially flush with a corresponding side edge of the insulating panel and of the layer of insulating material, such that several identical insulating panels may be laid side by side with the longitudinal edges thereof next to, and in contact with, one another, and with the projecting portion of said first main longitudinal rib of an insulating panel superimposed to said second main longitudinal rib of another insulating panel.

15. The panel according to claim 14, wherein the panel has associated thereto a bracket element, adapted to be fitted over superimposed ribs of two insulating panels arranged side by side, the bracket element being provided with wings adapted to rest over the auxiliary units associated with said two panels, to maintain said units in position over the respective insulating panels.

16. The panel according to claim 14, wherein each auxiliary longitudinal rib has a transverse section with a substantially dovetail shape.

17. The panel according to claim 14, wherein said auxiliary panel unit is a photovoltaic unit.

18. The panel according to claim 17, wherein at least one pipe element for passage of cables for electrical connection of said photovoltaic unit is provided between the first and second sheet of the insulating panel.

19. A roof panel, comprising
- a first sheet of rigid material, having a plurality of substantially parallel longitudinal ribs that rise from a general plane of a respective face of the panel,
- at least one auxiliary panel unit, resting and supported at least at, or close to, two opposed edges of said unit on two main longitudinal ribs of said plurality of ribs, such that said auxiliary panel unit extends between said opposed edges at a distance from the afore mentioned general plane of the insulating panel,
- wherein said plurality of ribs includes at least one auxiliary longitudinal rib extending intermediate to said main longitudinal ribs at a distance therefrom, on which auxiliary longitudinal rib at least the auxiliary panel unit rests in an intermediate area between the two said opposed edges,
- wherein said main longitudinal ribs extend in height above the plane on which the auxiliary panel unit lies and are shaped such that each defines a resting surface of a corresponding edge of the auxiliary panel unit and a surface that delimits a seat for the auxiliary panel unit, orthogonal to said resting surface, while said at least one auxiliary longitudinal rib has a height corresponding to the distance of the auxiliary panel unit from the aforementioned face of the roof panel, so as to define with a head surface thereof a resting surface for an intermediate area of the auxiliary panel unit,
- wherein two of said main longitudinal ribs are provided, that extend along two opposed longitudinal edges of said insulating panel,
- wherein a first one of said main longitudinal ribs has an upper portion that defines the aforementioned orthogonal surface delimiting the seat for the auxiliary panel unit and that projects laterally,
- and wherein the second main longitudinal rib, that is arranged along an opposite longitudinal edge of the roof panel, has an upper portion that defines the aforementioned orthogonal surface delimiting the seat for the auxiliary panel unit, that terminates substantially flush with a corresponding side edge of the roof panel,
- such that several identical roof panels may be laid side by side with the longitudinal edges thereof next to, and in contact with, one another, and with the projecting portion of said first main longitudinal rib of a roof panel superimposed to said second main longitudinal rib of another roof panel.

* * * * *

UNITED STATES PATENT AND TRADEMARK OFFICE
CERTIFICATE OF CORRECTION

PATENT NO. : 8,006,452 B2  
APPLICATION NO. : 12/207862  
DATED : August 30, 2011  
INVENTOR(S) : Esterino Ceria It is certified that error appears in the above-identified patent and that said Letters Patent is hereby corrected as shown below:

IN THE CLAIMS:

Column 8, Line 42, Claim 14: Delete "wherein to" and insert --wherein two--

Column 9, Line 22, Claim 19: Delete "insulating panel" and insert --roof panel--

Column 10, Line 12, Claim 19: Delete "insulating panel" and insert --roof panel--

Signed and Sealed this
First Day of November, 2011

David J. Kappos
*Director of the United States Patent and Trademark Office*